(12) United States Patent
Andrews et al.

(10) Patent No.: US 10,902,343 B2
(45) Date of Patent: Jan. 26, 2021

(54) DEEP-LEARNING MOTION PRIORS FOR FULL-BODY PERFORMANCE CAPTURE IN REAL-TIME

(71) Applicant: Disney Enterprises, Inc., Burbank, CA (US)

(72) Inventors: Sheldon Andrews, Ottawa (CA); Ivan Huerta Casado, Edinburgh (GB); Kenneth J. Mitchell, Earlston (GB); Leonid Sigal, Pittsburgh, PA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 956 days.

(21) Appl. No.: 15/283,036

(22) Filed: Sep. 30, 2016

(65) Prior Publication Data

US 2018/0096259 A1 Apr. 5, 2018

(51) Int. Cl.
*G06N 20/00* (2019.01)
*G06N 3/08* (2006.01)
(Continued)

(52) U.S. Cl.
CPC ........... *G06N 20/00* (2019.01); *G06N 3/0445* (2013.01); *G06N 3/0454* (2013.01); *G06N 3/08* (2013.01);
(Continued)

(58) Field of Classification Search
CPC ......... G06T 19/006; G06T 17/00; G06T 7/20; G06K 9/00; G06K 9/00201; G06K 9/00221; G06K 9/00335; H04N 5/225
See application file for complete search history.

(56) References Cited

U.S. PATENT DOCUMENTS 6,750,866 B1 * 6/2004 Anderson, III ........... G06T 7/20
345/473
9,129,158 B1 * 9/2015 Medasani .......... G06K 9/00335
(Continued)

OTHER PUBLICATIONS

Daniel Holden, Jun Saito and Taku Komura, "A Deep Learning Framework for Character Motion Synthesis and Editing", Jul. 28, 2016, ACM Transactions on Graphics, vol. 35 Issue 4, Article No. 138.*

(Continued)

*Primary Examiner* — Kamran Afshar
*Assistant Examiner* — Benjamin J Buss
(74) *Attorney, Agent, or Firm* — Kilpatrick Townsend & Stockton LLP

(57) ABSTRACT

Training data from multiple types of sensors and captured in previous capture sessions can be fused within a physics-based tracking framework to train motion priors using different deep learning techniques, such as convolutional neural networks (CNN) and Recurrent Temporal Restricted Boltzmann Machines (RTRBMs). In embodiments employing one or more CNNs, two streams of filters can be used. In those embodiments, one stream of the filters can be used to learn the temporal information and the other stream of the filters can be used to learn spatial information. In embodiments employing one or more RTRBMs, all visible nodes of the RTRBMs can be clamped with values obtained from the training data or data synthesized from the training data. In cases where sensor data is unavailable, the input nodes may be unclamped and the one or more RTRBMs can generate the missing sensor data.

11 Claims, 10 Drawing Sheets

(51) Int. Cl.
  *G06T 7/246* (2017.01)
  *G06N 3/04* (2006.01)
  *G06K 9/00* (2006.01)
(52) U.S. Cl.
  CPC .......... *G06T 7/251* (2017.01); *G06K 9/00342* (2013.01); *G06T 2207/20084* (2013.01); *G06T 2207/30196* (2013.01)

(56) References Cited

U.S. PATENT DOCUMENTS

| | | | | |
|---|---|---|---|---|
| 10,270,642 | B2* | 4/2019 | Zhang | H04L 27/362 |
| 10,706,350 | B1* | 7/2020 | Tran | G06N 3/08 |
| 2013/0127873 | A1* | 5/2013 | Popovic | G06T 13/40 345/473 |
| 2017/0018121 | A1* | 1/2017 | Lawson | G06T 3/0093 |
| 2017/0255832 | A1* | 9/2017 | Jones | G06K 9/00718 |
| 2017/0316578 | A1* | 11/2017 | Fua | G06T 7/246 |
| 2017/0368413 | A1* | 12/2017 | Shavit | G06K 9/00342 |
| 2018/0024641 | A1* | 1/2018 | Mao | G06T 7/251 382/103 |
| 2018/0070864 | A1* | 3/2018 | Schuster | A61B 5/0077 |
| 2018/0096259 | A1* | 4/2018 | Andrews | G06N 3/0454 |
| 2018/0183650 | A1* | 6/2018 | Zhang | G01S 13/00 |
| 2018/0333104 | A1* | 11/2018 | Sitek | G06N 3/0454 |
| 2019/0197715 | A1* | 6/2019 | Rebecq | G06T 15/06 |
| 2019/0295305 | A1* | 9/2019 | Yang | G06T 13/40 |
| 2020/0051254 | A1* | 2/2020 | Habibian | G06N 3/08 |

OTHER PUBLICATIONS

Yong Du, Wei Wang and Liang Wang, "Hierarchical Recurrent Neural Network for Skeleton Based Action Recognition", Jun. 12, 2015, 2015 IEEE Conference on Computer Vision and Pattern Recognition, pp. 1110-1118.*

Karen Simonyan and Andrew Zisserman, "Two-Stream Convolutional Networks for Action Recognition in Videos", Jun. 9, 2014, NIPS '14 27th International Conference on Neural Information Processing Systems, vol. 1, pp. 568-576.*

Ilya Sutskever, Geoffrey Hinton and Graham Taylor, "The Recurrent Temporal Restricted Boltzmann Machine", 2008, Advances in Neural Information Processing Systems 21 (NIPS 2008).*

Kehl W., Milletari F., Tombari F., Ilic S., Navab N. "Deep Learning of Local RGB-D Patches for 3D Object Detection and 6D Pose Estimation", Springer, European Conference on Computer Vision, vol. 9907, pp. 205-220.*

Grochow, K. et al. (2004). "Style-based inverse kinematics." ACM SIGGRAPH 2004 Papers. 2004. 522-531. (Year: 2004).*

Maycock, J. et al. (2015). "Fully automatic optical motion tracking using an inverse kinematics approach." 2015 IEEE-RAS 15th International Conference on Humanoid Robots (Humanoids). IEEE, 2015. (Year: 2015).*

Park, S. II et al. (2006). "Capturing and animating skin deformation in human motion." ACM Transactions on Graphics (TOG) 25.3 (2006): 881-889. (Year: 2006).*

Wei, X. et al. (2012). "Accurate realtime full-body motion capture using a single depth camera." ACM Transactions on Graphics (TOG) 31.6 (2012): 1-12. (Year: 2012).*

Plantard, P. et al. (Sep. 2017). "Inverse dynamics based on occlusion-resistant Kinect data: Is it usable for ergonomics?." International Journal of Industrial Ergonomics 61 (Sep. 2017): 71-80. DOI:10.1016/j.ergon.2017.05.010 (Year: 2017).*

Hou, Y. et al. (2016). "Skeleton optical spectra-based action recognition using convolutional neural networks." IEEE Transactions on Circuits and Systems for Video Technology 28.3 (Nov. 14, 2016): 807-811. DOI:10.1109/TCSVT.2016.2628339 (Year: 2016).*

Akhter et al., "Bilinear spatiotemporal basis models", ACM Transactions on Graphics (TOG), 2012.

Bengio, "Learning deep architectures for AI", Foundations and Trends in Machine Learning, 2009, 1-127.

Du et al., "Hierarchical Recurrent Neural Network for Skeleton Based Action Recognition", Proceedings of the IEEE Conference on Computer Vision and Pattern Recognition, 2015, 1110-1118.

Fukushima, "Neocognitron: A self-organizing neural network model for a mechanism of pattern recognition unaffected by shift in position", Biol. Cyb., 1980, 193-202.

Hinton et al., "A fast learning algorithm for deep belief nets", Neural Computation, 2006, 1527-1554.

Hinton et al., "Reducing the dimensionality of data with neural networks", Science, Jul. 2006, 504-507.

Ji et al., "3d convolutional neural networks for human action recognition", IEEE Trans. Pattern Anal. Mach. Intell., 2013, 221-231.

Lawrence, "Learning for larger datasets with the Gaussian process latent variable model", International Conference on Artificial Intelligence and Statistics, 2007.

Lecun et al., "Gradient-based learning applied to document recognition", Proceedings of the IEEE, 1998, 2278-2324.

Sutskever et al., "The Recurrent Temporal Restricted Boltzmann Machine", University of Toronto, 2008.

Taylor et al., "Two distributed-state models for generating high-dimensional time series", The Journal of Machine Learning Research, 2011, 1025-1068.

Wang et al., "Gaussian Process Dynamical Models for Human Motion", in IEEE Transactions on Pattern Recognition and Machine Intelligence, Feb. 2008, 283-298.

Zhang et al., "Leveraging Depth Cameras and Wearable Pressure Sensors for Full-body Kinematics and Dynamics Capture", SIGGRAPH Asia, 2014.

* cited by examiner

DEEP-LEARNING MOTION PRIORS FOR FULL-BODY PERFORMANCE CAPTURE IN REAL-TIME

BACKGROUND OF THE INVENTION

Embodiments relate to computer capture of object motion. More specifically, embodiments relate to capturing of movement or performance of an actor.

Animation has been based more directly upon physical movement of actors. This animation is known as motion capture or performance capture. For capturing motion of an actor, the actor is typically equipped with a suit with a number of markers, and as the actor moves, a number of cameras or optical sensors track the positions of the markers in space. This technique allows the actor's movements and expressions to be captured, and the movements and expressions can then be manipulated in a digital environment to produce whatever animation is desired. Modern motion capture systems may include various other types of sensors, such as inertial sensors. The inertial sensors typically comprise an inertial measurement unit (IMU) having a combination of gyroscope, magnetometer, and accelerometer for measuring rotational rates, such as orientation, linear acceleration and gyro rate. Markerless Motion Capturing (Mocap) is another active field of research in motion capture. The goal of Mocap is to determine the 3D positions and orientations as well as the joint angles of the actor from image data. In such a tracking scenario, it is common to assume as input a sequence of multiview images of the performed motion as well as a surface mesh of the actor's body.

In motion capture sessions, movements of the actor are typically sampled by a motion capture system many times per second as motion data. The motion data can be transmitted to a computer and can be mapped to a 3D model on the computer so that the 3D model may perform the same actions as the actor. However, traditional approaches for mapping the motion data to the 3D model are typically not able to reconstruct accurately the motion when only a small number of sensors and/or markers is used, and also fails when there is sensor dropout—i.e., when one or more sensors or makers fall off the actor's body during a capture session. This makes the traditional approaches not suitable for live performance scenarios and visualization in virtual production applications.

Furthermore, although some prior art has proposed statistical motion estimators to estimating missing information, they are typically only well-suited for a single style of motion, or otherwise require significant computational overhead for online estimation of a general class of motion. For example, some previous algorithms include use of Gaussian processes using latent variables or using dynamic models. Bilinear Spatiotemporal Basis Models and Deep learning approaches using Conditional Restricted Boltzmann Machines have also been used. However, these methods are typically only well-suited for a single style of motion or are not able to generalize with accuracy needed for high quality production. Conditional Neural Networks or Recurrent Neural Networks have also been used for Mocap but in the field of action recognition. Some prior art uses a compact statistical prior based on a large human motion database, but requires dense sensor information from multiple depth cameras.

BRIEF SUMMARY OF THE INVENTION

Embodiments can improve motion estimation by using deep learning techniques with motion priors. Motion capture can be improved using deep motion priors with inverse dynamics, in particular when sparse sensor configuration is used. The advantage to use deep motion priors in conjunction with inverse dynamics is that inverse dynamics is used to solve for orientation and position constraints introduced by the sensors during the capture, while motion priors can be used to constrain the pose for each frame. Using various deep learning techniques, the deep motion priors can be trained to generalize a broad range of motion classes through one or more motion models. During real-time motion capture, the one or more motion models can be used to obtain an improved reconstruction of actor's motion even when the motion capture system employs a configuration with a sparse set of sensors or when there are sensor dropouts. This can avoid tedious post processing tasks for motion data cleanup in conventional motion capture methods. This can address problems due to missing and mislabeled markers, and/or broken denoise trajectories during the motion capture. Furthermore, the motion learning techniques in accordance with the disclosure can also be used to reconstruct the actor's motion even when there are missing data points in the motion data with respect to both space and time.

In various embodiments, training data from multiple types of sensors and captured in previous capture sessions are fused within a physics-based tracking framework to train motion priors using different deep learning techniques, such as convolutional neural networks (CNN) and Recurrent Temporal Restricted Boltzmann Machines (RTRBMs). The training data can include temporal and spatial information provided for the sensors. In embodiments employing one or more CNNs, two streams of filters can be used. In those embodiments, one stream of the filters can be used to learn the temporal information and the other stream of the filters can be used to learn spatial information. Also in those embodiments, both filters are connected using a full connected neural network or a recurrent neural network (RNN).

In the embodiments employing one or more RTRBMs, all visible nodes of the RTRBMs can be clamped with values obtained from the training data or data synthesized from the training data. These embodiments can provide high quality motion estimation in scenarios where sensor dropout is frequent, and therefore have the advantage of dealing effectively with missing motion information. In cases where sensor data is unavailable, the input nodes may be unclamped and the one or more RTRBMs can generate the missing sensor data. The recurrent nature of the RTRBM allows patterns and latent variables to be extracted from a time series of motion data without having to explicitly store and manage large amounts of the motion data at runtime.

In certain embodiments, a common database can be used store motion priors trained by different deep learning techniques with different motion models. During a real-time motion capture session, one or more the motion models can be used to estimate missing motion information. For example, the RTRBM motion model(s) can be used to deal more effectively with missing data, and the CNN motion models can be applied to a generalized range of scenarios.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

DETAILED DESCRIPTION OF THE INVENTION

Figure 1:
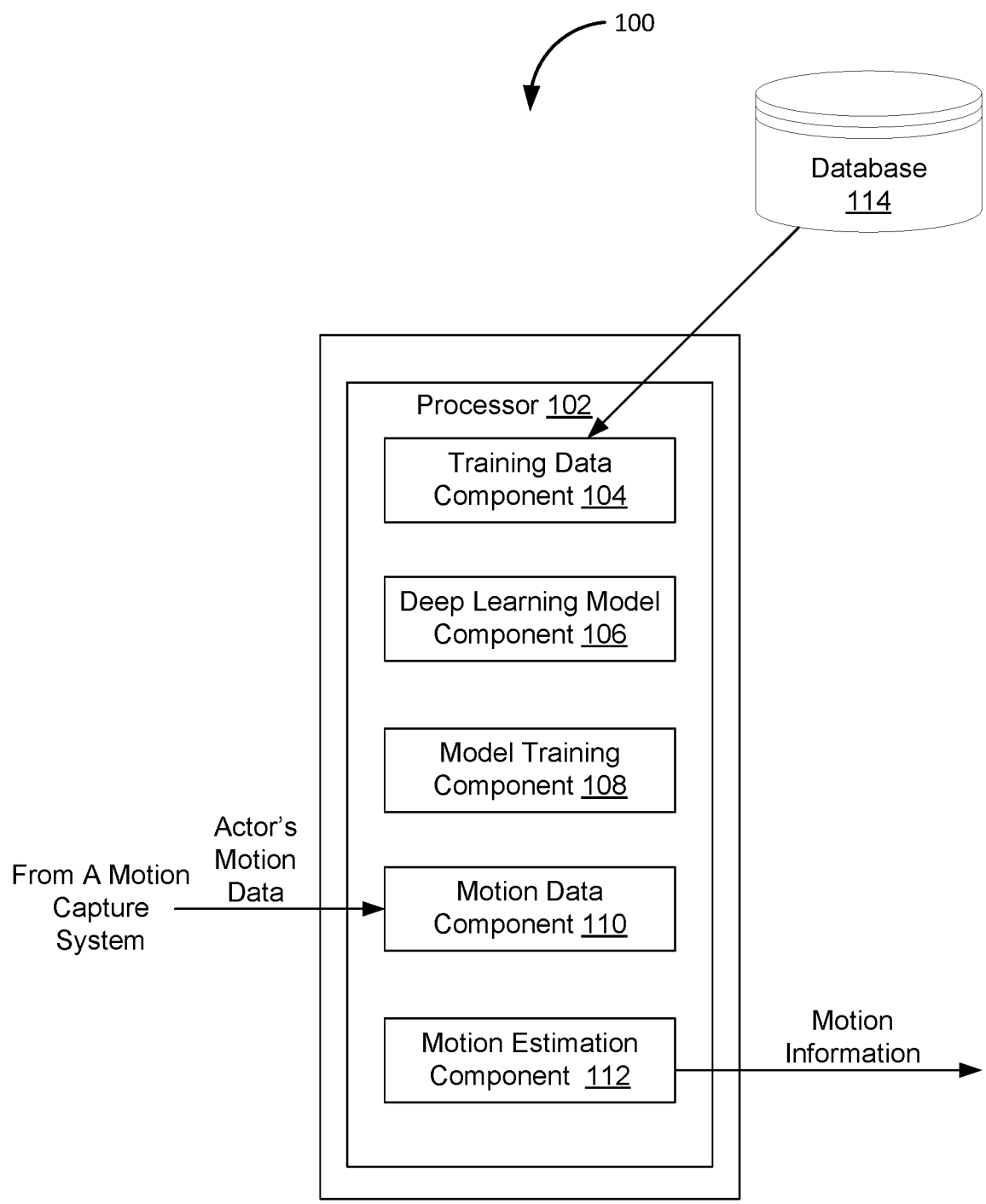
FIG. 1 illustrates an example of a system configured for estimating motion information from motion data by using one or more motion models in accordance with the disclosure.

Deep learning models are a class of machines that can learn a hierarchy of features by building high-level features from low-level ones, thereby automating the process of feature construction. Actions of an actor (e.g., human or animal) can be represented by trajectories of the actor's skeleton joints. Spatial structure and temporal dynamics of the actor's skeleton can be modeled as features. Data from motion capture sessions of the actor can provide such temporal and spatial information, which can be used to train, offline, motion priors—generalized motion classes that can be used to recognize the actor's motion—using different deep learning techniques. During a real-time motion capture of that actor (or a different actor), the afore-described motion priors or the deep motion priors can be used to reconstruct the actor's motion even when certain motion information regarding the actor's movement is missing—for example due to sensor dropouts during the capture and/or due to a sparse senor configuration employed by a motion capture system for the session. In some embodiments, the deep motion priors are used in conjunction with inverse dynamics to estimate the actor's motion. The inverse dynamics can be used to solve for orientation and position constraints (e.g., occlusion or sensor dropouts) and introduced by one or more sensors during the capture, and the deep motion priors can be used to constrain an actor's pose for each frame.

In some embodiments, the deep learning models employed in accordance with the disclosure may include one or more convolutional neural networks (CNN), which are a type of deep learning models in which trainable filters and local neighborhood pooling operations are applied alternatively on the raw input data, resulting in a hierarchy of increasingly complex features—see for example LeCun et al. 1998, which is incorporated herein by reference in its entirety. In some of those embodiments, the trainable filters in the CNN may include a first filter that can learn temporal relationship of the actor's or actors' motion from training data—e.g., motion data of the actor or actors captured in historical sessions, and a second filter that can learn spatial relationship of the actor's or actors' motion from the training data. The two filters can be learned independently through two different streams—i.e., a spatial stream and a temporal stream. In some embodiments, a full feedforward neural net can be used to connect convolutions and pooling layers corresponding to the two filters. In some embodiments, other types of neural networks, such as a recurrent neural network (RNN), can be used to redefine a skeleton pose.

In some embodiments, the deep learning models employed in accordance with the disclosure may include one or more recurrent temporal restricted Boltzmann machines (RTRBMs). An RTRBM may include a generative class of stochastic neural networks and is generally described by Sutskever, et. al 2008, which is incorporated by reference herein in its entirety. RTRBM can provide high quality motion estimation in scenarios where sensor dropout is frequent, and therefore have the advantage of dealing effectively with missing data. In cases where sensor data is unavailable, the input nodes of may be unclamped and the RTRBM will generate the missing sensor data.

FIG. 1 illustrates an example of a system 100 configured for estimating motion information from motion data by using one or more motion models in accordance with the disclosure. As shown, system 100 may include one or more of a processor configured to implement computer program components. The computer program components can include an image processing component 104, a deep learning model component 106, a model training component 108, a motion data component 110, a motion estimation component 112, and/or any other components.

The training data component 104 can be configured to obtain training data for training one or more deep learning models. The training data obtained by the training data component 104 can include sensor data from one or more IMUs, optical markers, and/or any other types of sensors. The sensor data may include captured data acquired at capture time, or synthesized data from the captured data. The training data may include spatial and/or temporal information regarding one or more actor's movement provided by the sensors. The training data can be obtained from multiple historical capture sessions. For example, sensor data indicating movement of the one or more actors captured in multiple capture sessions can be stored and used as the training data. As shown, such historical sensor data can be stored in the database 114 and can be obtained by the training data component 104 from the database 114 as the training data.

Figure 3:
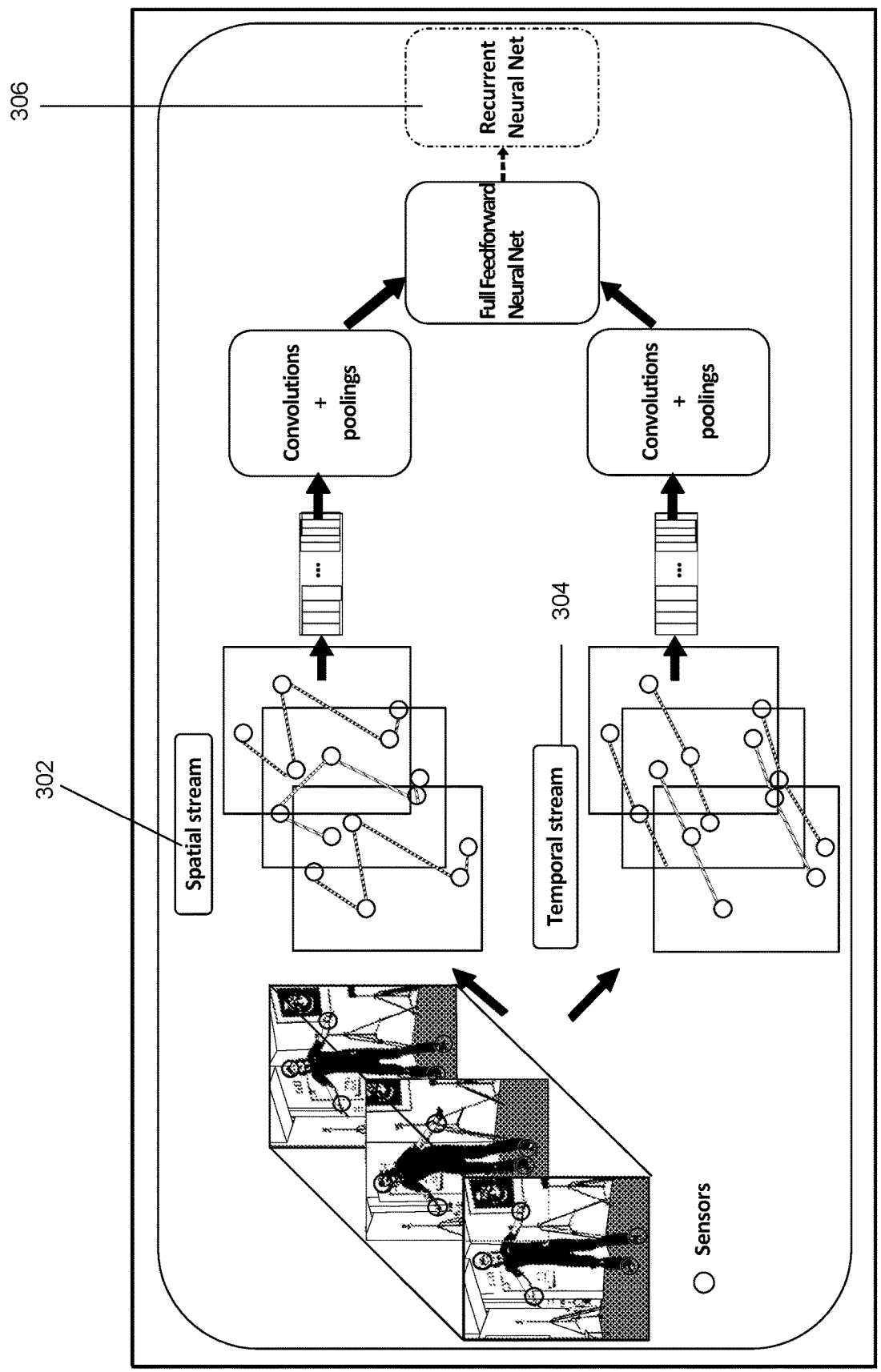
FIG. 3 illustrates an example of a CNN that can be obtained in accordance with the disclosure.

The deep learning model component 106 can be configured to obtain one or more deep learning models that can be trained using the training data obtained by the training data component 104. The deep learning models obtained by the deep learning model component 106 may include machines that can learn a hierarchy of features by building high-level features from low-level ones, thereby automating the process of feature construction—see for example Fukushima, 1980; LeCun et al., 1998; Hinton & Salakhutdinov, 2006; Hinton et al., 2006; Bengio, 2009, all of which are incorporated by reference herein in their entirety). The deep learning models obtained by the deep learning model component 106 can be trained to yield competitive performance in visual object recognition. The deep learning models obtained by the deep learning model component 106 can include a CNN, a RNN, a RTRBM and/or any other deep learning models. An example of a CNN 300 that can be obtained by the deep learning model component 106 is illustrated in FIG. 3. As shown in FIG. 3, the CNN obtained by the deep learning model component 106 can include two independent streams, a spatial stream 302 and a temporal stream 304. The spatial stream 302 can be configured to learn mainly the spatial relationship of the model and the temporal stream 304 can be configured to learn the temporal relationship of the model. In some embodiments, the spatial stream 302 can obtain all the information from the different sensors at the same time concatenating them, and the temporal stream 304 can be configured to receive the raw training data from the same sensors along a time window and can concatenate the different sensors later.

Figure 5:
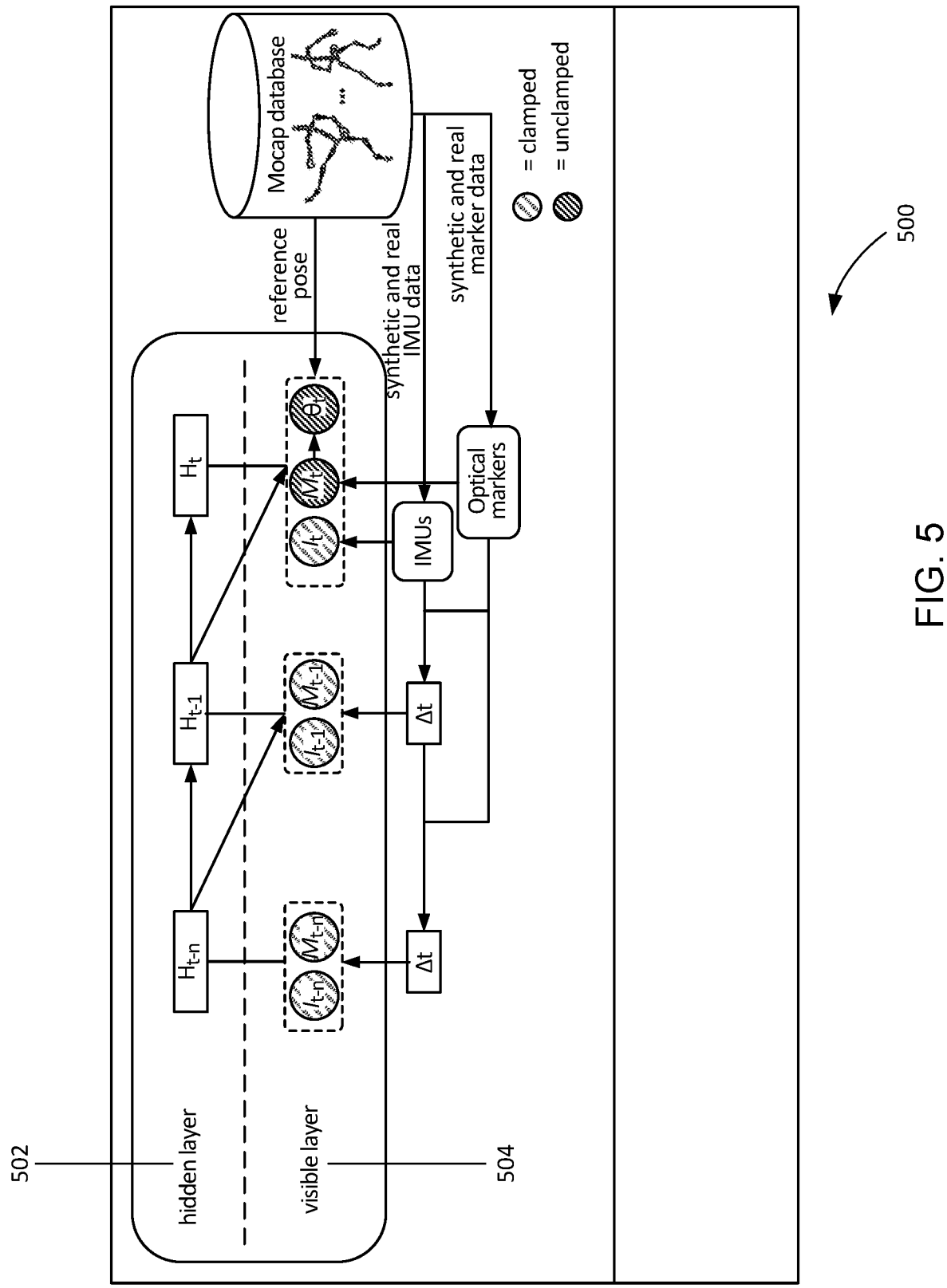
FIG. 5 illustrates an example of a RTRBM that can be obtained in accordance with the disclosure.

An example of a RTRBM 502 that can be obtained by the deep learning model component 106 is illustrated in FIG. 5. As shown in FIG. 5, the overall structure of the network forms a bipartite graph of consisting of two types of layers—a visible layer 504 and a hidden layer 506. A shown, each pair of hidden and visible layer nodes is connected. However, this is not intended to be limiting, and other structures can be used. The RTRBM 502 has an internal memory, and as such the RTRBM 502 can have multiple hidden and visible layers. The visible and hidden layer nodes in the RTRBM 502 in accordance with the disclosure can have the following properties:

Visible Layer
  IMU data ($I_t$), per sensor
  Orientation quat. (4×1 vector, real, unit length)
  Linear acceleration (3×1 vector, real, metres/s$^2$)
  Gyro rate of turn (3×1 vector, real, radians/s)
  Marker data ($M_t$), per sensor
  Position xyz (3×1 vector, real, metres)
  Skeleton pose ($\Theta_t$)
  Joint angles (mx1 vector, real, radians)
Hidden Layer
  Hidden layers $H_t$, $H_{t-1}$, ..., $H_{t-n}$ contain nodes with real and binary values.
  The visible nodes ($I_t$, $M_{6t}$, $\Theta_t$) ... ($I_{t-n}$, $M_{t-n}$) are connected to hidden layers t-1 ... t-n giving the network its recurrent structure
Visible layer nodes may be either clamped, meaning their values are fixed according to sensor\ground truth data, or unclamped, meaning their values are computed by simulating the network.

The model training component 108 can be configured to train the deep learning models obtained by the deep learning model component 106 using the training data obtained by the training data component 104. Training the deep learning models by the model training component 108 may involve inputting the training data to the deep learning models obtained by the deep learning model component 106 so that the deep learning models can be improved to estimate missing motion information based on known sensor data. In some implementations, the training of the deep learning model(s) by the model training component 108 can improve the ability of the deep learning model(s) to recognize a motion of an actor based on incomplete senor data information received from the motion sensors during motion capture sessions.

When the deep learning models obtained by the deep learning model component 106 include a CNN, in some embodiments, the training by the model training component 108 may include providing the raw training data from one or more motion sensors as captured in the historical capture sessions to independent streams in the CNN, e.g., the spatial stream 302 and the temporal stream 304 as shown in FIG. 3. The training can also include grouping the raw training data differently to maximize the information to be extracted. During the training provided by the model training component 108, in those embodiments, a series of hidden layers containing convolutions and poolings over the input sensor raw training data can learn the spatial and temporal relationship by creating filters for each of the streams. The different layers can learn different relationships from a more local relationship in the first layers to a more global in the last layers. The filters learned in the spatial stream 302 can be more related to the spatial relationship of the sensors, while the filters learned in the temporal stream 304 can be more related to the temporal relationship of the sensors. A fully connected feedforward neural net (RNN) 306 can be employed during the training to map the sensor data and a given ground truth skeleton pose, thereby training the model (filters and weights) using a stochastic gradient descent with RELU activation. In some embodiments, another recurrent neural net can be employed to redefine the skeleton pose. In some embodiments, for maximizing generalization of the learned model and avoiding overfitting, a regularization term (weight decay), the momentum and dropout (random subsampling of n of the total units of the layer, which has been proved useful to prevent overfitting) can be incorporated into the training model.

While the two stream CNN model shown in FIG. 3 can generalize motion classes well, more sequences can be added a posteriori to increase the database and continue the training of the model with them. This can increase the accuracy and generalization of the model. It is contemplated that the weights of the model can hbe retrained using more specific sequences generated for a specific actor. This can improve the accuracy of the model for this specific actor. It is also contemplated creating databases where the actor is augmented physically with prosthetics to train a more specific model instead of a general model.

When the deep learning models obtained by the deep learning model component 106 include a RTRBM, in some embodiments, the training by the model training component 108 may include providing sensor data from the IMU and optical markers to the network in the last visible layer along with ground truth skeleton poses. As mentioned above, the sensor data may include real sensor data, acquired at the time of capture during the historical capture sessions, or synthesized sensor data from the ground truth skeleton data using forward kinematics. Sensor arrangements may vary according to different target configurations. For example, 17 IMUs and 30+ optical markers may be used to capture dense motion trajectories with redundant sensor information, whereas a sparse configuration such as 5-6 IMUs and 5-10 optical markers may be used if capture subject is limited due to costume. Due to the multi-modal nature of the data, the quantized sensor signals are normalized to facilitate training and prevent biasing toward an individual modality. Sensor data from previous frames (It-n,Mt-n) to (It-1,Mt-1) can be buffered and also presented to the network, with a history of n frames. This can occur during training and online during performance capture. During the training provided by the model training component 108, in those embodiments, the pose data Θ can be clamped. An algorithm, such as contrastive divergence, can be used to learn network weights connecting nodes between the hidden and visible layers in those embodiments.

The motion data component 110 can be configured to receive, from sensors, real-time motion data during an online motion capture session. The motion data received by the motion data component 110 may provide certain motion information regarding an actor's movement during the online motion capture session. In some situations, the motion data received by motion data component 110 may not provide sufficient motion information for mapping the movement of the actor to the 3D model. For example, as mentioned above, there may be sensor dropouts during online performance capture of the actor, or certain motion information is missing due to sparse sensor configuration. When the deep learning model(s) obtained by the deep learning model component 106 include a CNN, in some embodiments, the received motion data can be the same type of raw training data generated from the sensors and used for training the deep learning model(s). In those embodiments, the received motion data can be tested in real time using the trained model and as output it obtains the skeleton pose.

The motion estimation component 112 can be configured to estimate motion information regarding the actor's motion based on the motion data received by the motion data component 110 using the deep learning model(s) trained by the model training component 108. The motion estimation by the motion estimation component 112 may involve using the motion data of multiple sensor types and fusing them within a physics-based tracking framework. In some embodiments, the motion estimation component 112 can be configured to use the deep learning model(s) with inverse dynamics. In those embodiments, the inverse dynamics can be used to solve for orientation and position constraints introduced by the sensors.

When the deep learning model(s) trained by the model training component 108 include a CNN, in some embodiments, the motion estimation by the motion estimation component 112 can include estimating the pose using two streams, e.g., spatial stream 302 and temporal stream 304, at frame t, and the estimated pose can be used as a reference pose for an inverse kinematics or inverse dynamics tracker. In those embodiments, the motion estimation by the motion estimation component 112 can include combining sensor data and pose estimates to provide a novel fusion and prediction solution for estimating missing motion information from the received motion data. In those embodiments, the deep learning model(s) generalize well across a broad range of motion and works for dense and sparse sensor configurations. In those embodiments, the motion estimation by the motion estimation component 112 may include tracking and stabilizing the reference pose by ensuring that kinematic and physical constraints are met. The motion estimation by the motion estimation component 112 may include obtaining an accurate reconstruction of the motion. This can avoid the tedious post processing tasks for data cleanup, and the problems due to missing and mislabeled markers, and broken and denoise trajectories.

When the deep learning model(s) trained by the model training component 108 include a RTRBM, in some embodiments, may include estimating the pose using the RTRBM at a frame t and using the estimated pose as the inverse kinematics or inverse dynamics tracker. In those embodiments, the motion estimation by the motion estimation component 112 can include combining sensor data and pose estimates to provide a novel fusion and prediction solution for estimating missing motion information from the received motion data. In those embodiments, tracking and stabilizing the reference pose by ensuring that kinematic and physical constraints are met; and leveraging the generative capabilities of the RTRBM. Due to the recurrent and temporal nature of the RTRBM network, the motion estimation by the motion estimation component 112 can rely on previous frames when sensor data was available to predicate motion. For example, when optical marker data during online performance capture is unavailable due to occlusion (although the dropout scenario also applied to missing IMU data, partial dropout, or mixtures of dropout across sensor modalities), the visible layer nodes which correspond to the unavailable sensor data are unclamped. The motion estimation by motion estimation component 112 in that example can include simulating the network to allow these nodes to take on a value which is probable given other sensor data, and previous motion estimates which are encoded by the recurrent hidden layers and buffered sensor data from previous frames.

Figure 2:
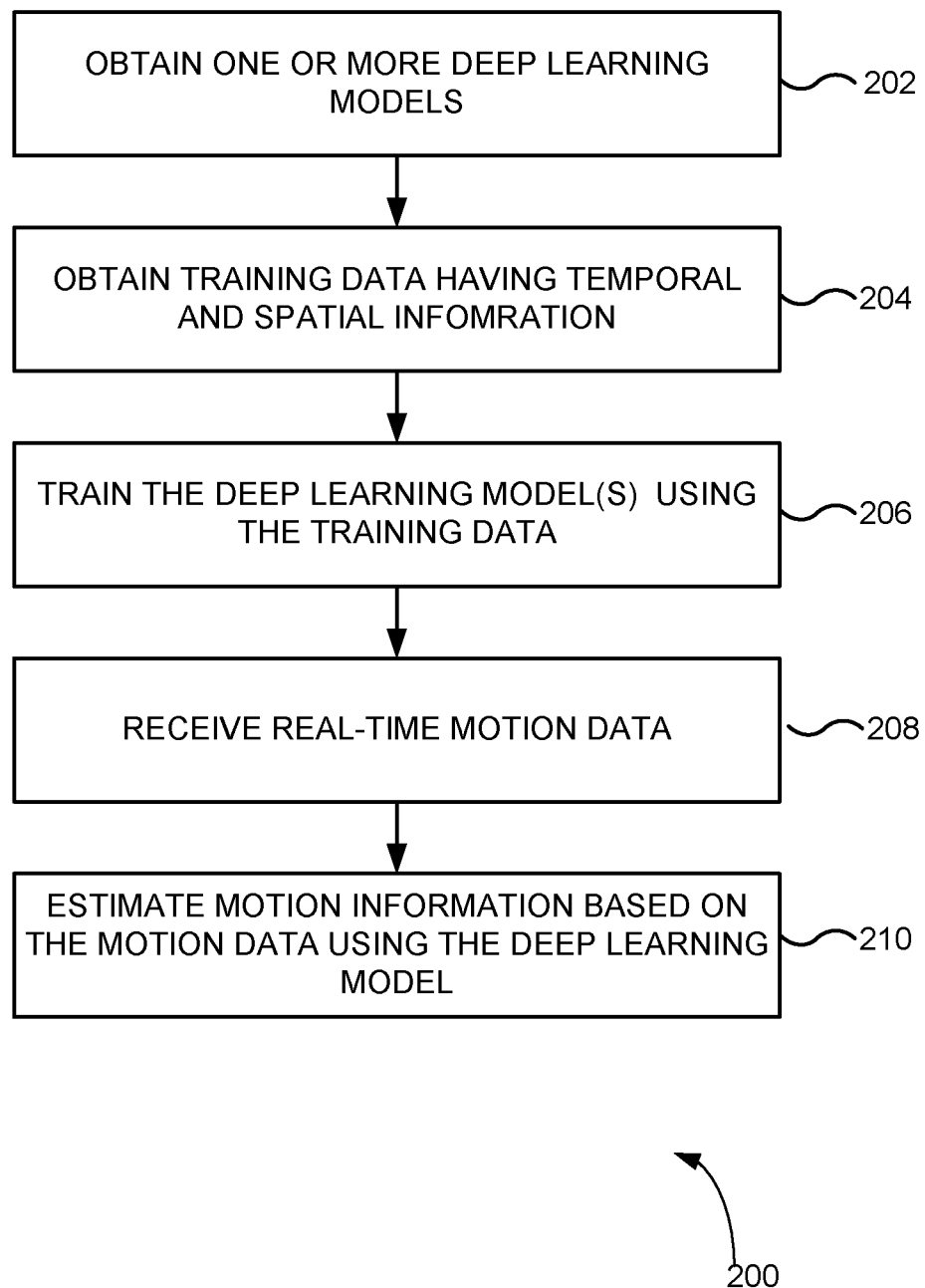
FIG. 2 illustrates an exemplary method for estimating motion from motion data using deep learning model.

With general system architecture and various components of system 100 having been described, attention now is directed to FIG. 2, where an exemplary method for estimating motion from motion data using deep learning model is illustrated. The particular series of processing steps depicted in FIG. 2 is not intended to be limiting. It is appreciated that the processing steps may be performed in an order different from that depicted in FIG. 2 and that not all the steps depicted in FIG. 2 need be performed. In certain implementations, the method 200 may be implemented by a computer system, such as the computer system 100 shown in FIG. 1.

In some embodiments, the method depicted in method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At 202, one or more deep learning models is obtained. The deep learning models obtained at 202 may include machines that can learn a hierarchy of features by building high-level features from low-level ones, thereby automating the process of feature construction. The deep learning models obtained by the deep learning model component 106 can be trained to yield competitive performance in visual object recognition. As described above, the deep learning model obtained at 202 may include a CNN, a RNN, a RTRBM, and/or any other deep learning models. An example of a CNN 300 that can be obtained by the deep learning model component 106 is illustrated in FIG. 3 and is described above. An example of a RTRBM 502 that can be obtained by the deep learning model component 106 is illustrated in FIG. 5, and is described above. In some implementations, operations involved in 202 may be implemented by a deep learning model component the same as or substantially similar to the deep learning model component 106 illustrated and described herein.

At 204, training data including spatial and temporal information can be obtained. The training data obtained at 204 can include sensor data from one or more IMUs, optical markers, and/or any other types of sensors. The sensor data may include captured data acquired at capture time, or synthesized data from the captured data. The training data can be obtained from multiple historical capture sessions. For example, sensor data indicating movement of the one or more actors captured in multiple capture sessions can be stored and used as the training data. In some implementations, operations involved in 204 may be implemented by a training data component the same as or substantially similar to the training data component 104 illustrated and described herein.

At 206, the deep learning model(s) obtained at 202 can be trained using the training data obtained at 204. Training the deep learning model(s) at 202 may involve inputting the training data to the deep learning model(s) so that the deep learning model(s) can be improved to estimate missing motion information based on known sensor data. In some implementations, the training of the deep learning model(s) at 206 can improve the ability of the deep learning model(s) to recognize a motion of an actor based on incomplete senor data information received from the motion sensors during motion capture sessions.

When the deep learning model(s) obtained at 202 include a CNN, in some embodiments, the training at 206 may include providing the raw training data from one or more motion sensors as captured in the historical capture sessions to independent streams in the CNN, e.g., the spatial stream 302 and the temporal stream 304 as shown in FIG. 3. During the training at 206, in those embodiments, a series of hidden layers containing convolutions and poolings over the input sensor raw training data can learn the spatial and temporal relationship by creating filters for each of the streams. The different layers can learn different relationships from a more local relationship in the first layers to a more global in the last layers. A fully connected feedforward neural net (RNN) can be employed during the training at 202 to map the sensor data and a given ground truth skeleton pose, thereby training the model (filters and weights) using a stochastic gradient descent with RELU activation.

When the deep learning models obtained at 202 include a RTRBM, in some embodiments, the training at 206 may include providing sensor data from the IMU and optical markers to the network in the last visible layer along with ground truth skeleton poses. During the training at 206, the sensor data may include real sensor data, acquired at the time of capture during the historical capture sessions, or synthesized sensor data from the ground truth skeleton data using forward kinematics. Sensor arrangements may vary according to different target configurations. For example, 17 IMUs and 30+ optical markers may be used to capture dense motion trajectories with redundant sensor information, whereas a sparse configuration such as 5-6 IMUs and 5-10 optical markers may be used if capture subject is limited due to costume.

During the training provided by the model training component 108, in those embodiments, the pose data Θ can be clamped. An algorithm, such as contrastive divergence, can be used to learn network weights connecting nodes between the hidden and visible layers in those embodiments.

In some implementations, operations involved in 206 may be implemented by a model training component the same as or substantially similar to the model training component 108 illustrated and described herein.

At 208, real-time motion data can be received during online performance capture of an actor's movements. The motion data received at 208 may provide certain motion information regarding an actor's movement during the online motion capture session. In some situations, the motion data received at 208 may not provide sufficient motion information for mapping the movement of the actor to the 3D model. For example, as mentioned above, there may be sensor dropouts during online performance capture of the actor, or certain motion information is missing due to sparse sensor configuration. In some implementations, operations involved in 208 may be implemented by motion data component the same as or substantially similar to motion data component 110 illustrated and described herein.

At 210, motion information can be estimated based on the motion data received at 208 using the deep learning model(s) trained at 206. The motion estimation at 210 may involve using the motion data of multiple sensor types and fusing them within a physics-based tracking framework. In some embodiments, the motion estimation component 112 can be configured to use the deep learning model(s) with inverse dynamics. In those embodiments, the inverse dynamics can be used to solve for orientation and position constraints introduced by the sensors.

When the deep learning model(s) trained at 206 include a CNN, in some embodiments, operations involved in 210 can include estimating the pose using two streams, e.g., spatial stream 302 and temporal stream 304, at frame t, and the estimated pose can be used as a reference pose for an inverse kinematics or inverse dynamics tracker. In those embodiments, the motion estimation at 210 can include combining sensor data and pose estimates to provide a novel fusion and prediction solution for estimating missing motion information from the received motion data. In those embodiments, the motion estimation involved in 210 may include tracking and stabilizing the reference pose by ensuring that kinematic and physical constraints are met. The motion estimation by the motion estimation component 112 may include obtaining an accurate reconstruction of the motion. This can avoid the tedious post processing tasks for data cleanup, and the problems due to missing and mislabeled markers, and broken and denoise trajectories.

When the deep learning model(s) trained at 206 include a RTRBM, in some embodiments, may include estimating the pose using the RTRBM at a frame t and using the estimated pose as the inverse kinematics or inverse dynamics tracker. In those embodiments, the motion estimation at 206 can include combining sensor data and pose estimates to provide a novel fusion and prediction solution for estimating missing motion information from the received motion data. In those embodiments, tracking and stabilizing the reference pose by ensuring that kinematic and physical constraints are met; and leveraging the generative capabilities of the RTRBM. Due to the recurrent and temporal nature of the RTRBM network, the motion estimation by the motion estimation component 112 can rely on previous frames when sensor data was available to predicate motion. For example, when optical marker data during online performance capture is unavailable due to occlusion (although the dropout scenario also applied to missing IMU data, partial dropout, or mixtures of dropout across sensor modalities), the visible layer nodes which correspond to the unavailable sensor data are unclamped. The motion estimation at 210 in that example can include simulating the network to allow these nodes to take on a value which is probable given other sensor data, and previous motion estimates which are encoded by the recurrent hidden layers and buffered sensor data from previous frames.

In some implementations, operations involved in 210 may be implemented by motion estimation component the same as or substantially similar to the motion estimation component 112 illustrated and described herein.

Figure 4:
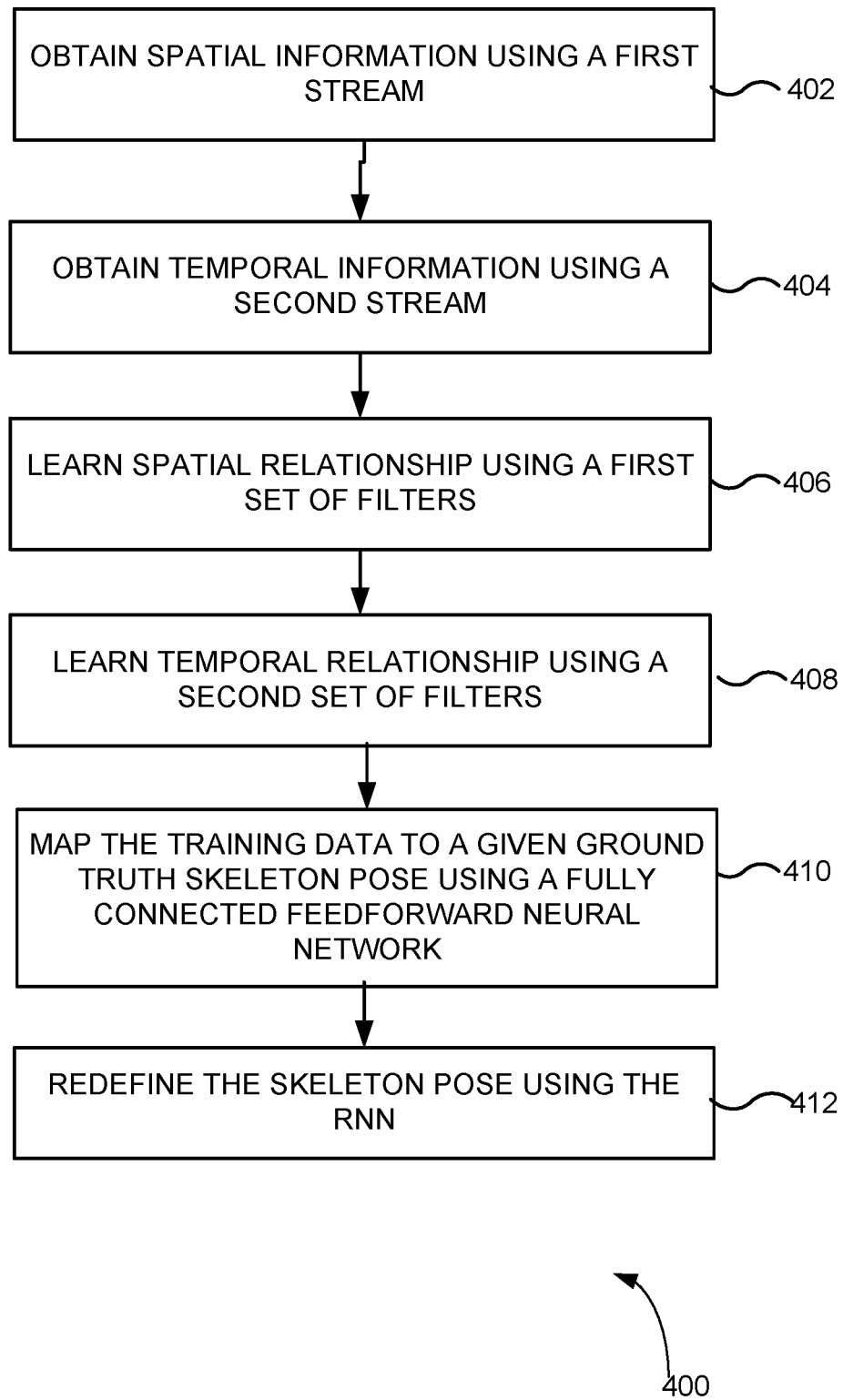
FIG. 4 illustrates an exemplary method for training a two stream CNN deep learning model in accordance with the disclosure.

As mentioned above, in some embodiments, the deep learning model(s) for estimating motion information may include a CNN. The CNN, in those embodiments, may include multiple streams of filters. One stream of filters can learn the temporal information and the other stream learns spatial information and both streams of filters can be finally connected using a full connected neural network or a recurrent neural network (RNN). This is illustrated in FIG. 3. FIG. 4 illustrates an exemplary method for training a two stream CNN deep learning model in accordance with the disclosure. The particular series of processing steps depicted in FIG. 4 is not intended to be limiting. It is appreciated that the processing steps may be performed in an order different from that depicted in FIG. 4 and that not all the steps depicted in FIG. 4 need be performed. In certain implementations, the method 400 may be implemented by a computer system, such as the computer system 100 shown in FIG. 1.

In some embodiments, the method depicted in method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At 402, spatial information regarding an actor's or actors' movements as captured in historical motion capture sessions can be obtained using a first stream of one or more filters in the CNN. As described above, during the training, the CNN can be provided with raw training data captured in the historical motion capture sessions, and the first stream of one or more filters can be grouped to maximize the spatial information to be extracted.

At 404, temporal information regarding the actor's or actors' movements as captured in historical motion capture sessions can be obtained using a second stream of one or more filters in the CNN. Similar to the first stream of one or more filters, the second stream of one or more filters can be grouped to maximize the temporal information to be extracted. It should be noted that the first and second streams of filters are separate and independent from each other. This is illustrated in FIG. 3.

At 406, spatial relationships regarding the actor's or actors' movements can be learned using the first stream of one or more filters. In some implementations, a series of hidden layers containing convolutions and poolings over the input sensor raw training data can be employed to learn the spatial relationships through the first stream of one or more filters. The layers can be configured to learn the spatial relationships from a more local relationship in the first layers to a more global in the last layers.

At 408, temporal relationships regarding the actor's or actors' movements can be learned using the second stream of one or more filters. In some implementations, the hidden layers mentioned above can also be employed to learn the temporal relationships through the second stream of one or more filters. Similar to learning the spatial relationships, the hidden layers can be configured to learn the temporal relationships from a more local relationship in the first layers to a more global in the last layers.

At 410, the training data is mapped to a given ground truth skeleton pose using a fully connected feedforward neural network. In some implementations, operations involved in 410 may include training the two stream CNN deep learning model (filters and weights) using a stochastic gradient descent with RELU activation.

At 412, a recurrent neural net is employed to redefine the skeleton pose. For maximizing the generalization of the learned model and avoid overfitting, in some embodiments, a regularization term (weight decay) can be incorporated in the training model, the momentum and dropout. For example, random subsampling of n of the total units of the layer can be employed to prevent overfitting.

It should be noted that the input data for the two stream CNN learning model is the raw data (received from the sensors. It will be the orientation, linear acceleration and gyro rate from the IMUs, and the position from the marker data. The output of the two stream CNN learning model is the ground truth skeletal pose that can be stored in the database.

Figure 8:
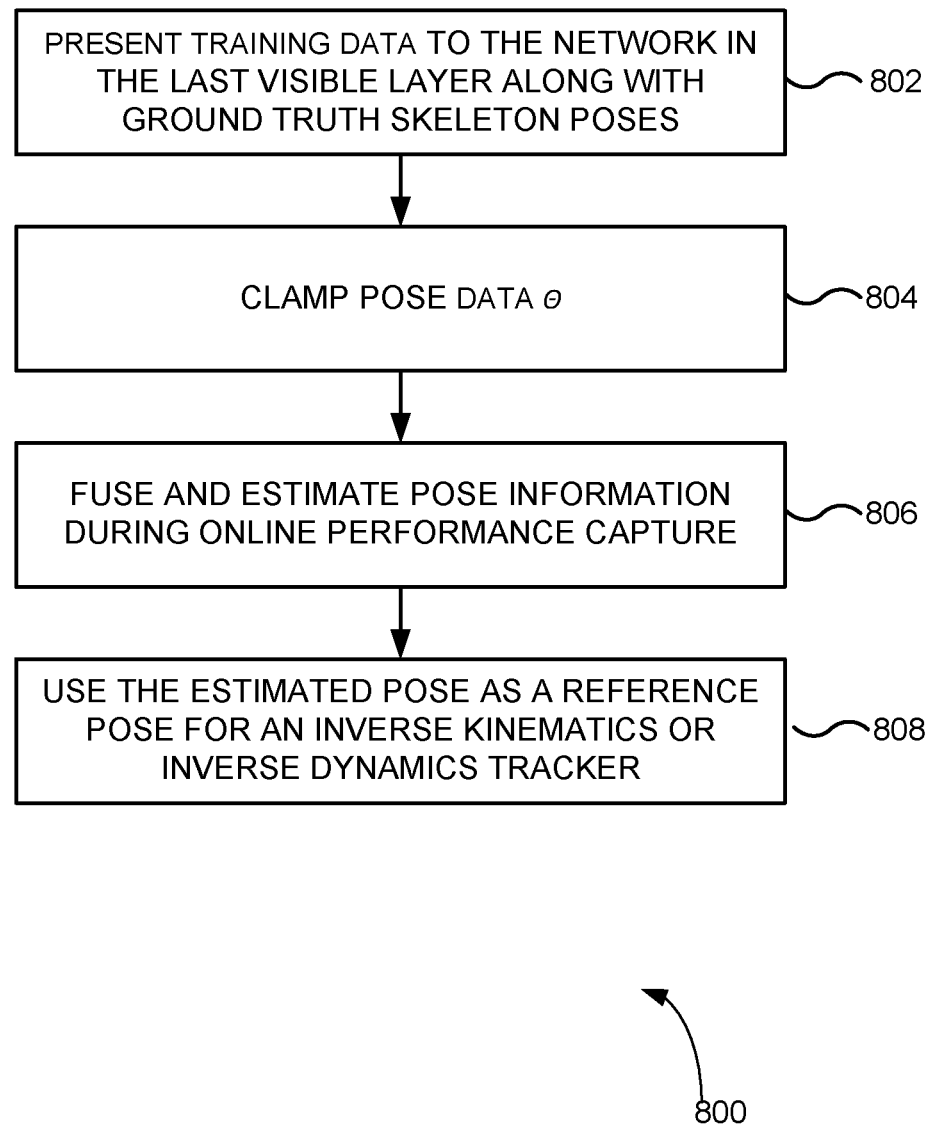
FIG. 8 illustrates an exemplary method for using a RTRBM deep learning model to estimate motion information in accordance with the disclosure.

FIG. 8 illustrates an exemplary method for using a RTRBM deep learning model to estimate motion information in accordance with the disclosure. The particular series of processing steps depicted in FIG. 8 is not intended to be limiting. It is appreciated that the processing steps may be performed in an order different from that depicted in FIG. 8 and that not all the steps depicted in FIG. 8 need be performed. In certain implementations, the method 800 may be implemented by a computer system, such as the computer system 100 shown in FIG. 1.

In some embodiments, the method depicted in method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 800.

At 802, sensor data from IMU and optical markers captured in the historical capture sessions is presented to the network in the last visible layer along with ground truth skeleton poses. As mentioned above, the sensor data may include real time data, i.e., acquired at the time of capture, and/or synthesized from the ground truth skeleton data using forward kinematics. Sensor arrangements may vary according to different target configurations. For example, 17 IMUs and 30+ optical markers may be used to capture dense motion trajectories with redundant sensor information, whereas a sparse configuration such as 5-6 IMUs and 5-10 optical markers may be used if capture subject is limited due to costume. Due to the multi-modal nature of the data, the quantized sensor signals can be normalized to facilitate training and prevent biasing toward an individual modality. Sensor data from previous frames (It-n,Mt-n) to (It-1,Mt-1) can be buffered and also presented to the network, with a history of n frames. This can occur during training and online during performance capture.

At 804, the pose data $\Theta$ is clamped. Operations at 804 may employing an algorithm, such as contrastive divergence, to learn network weights connecting nodes between the hidden and visible layers.

Figure 6:
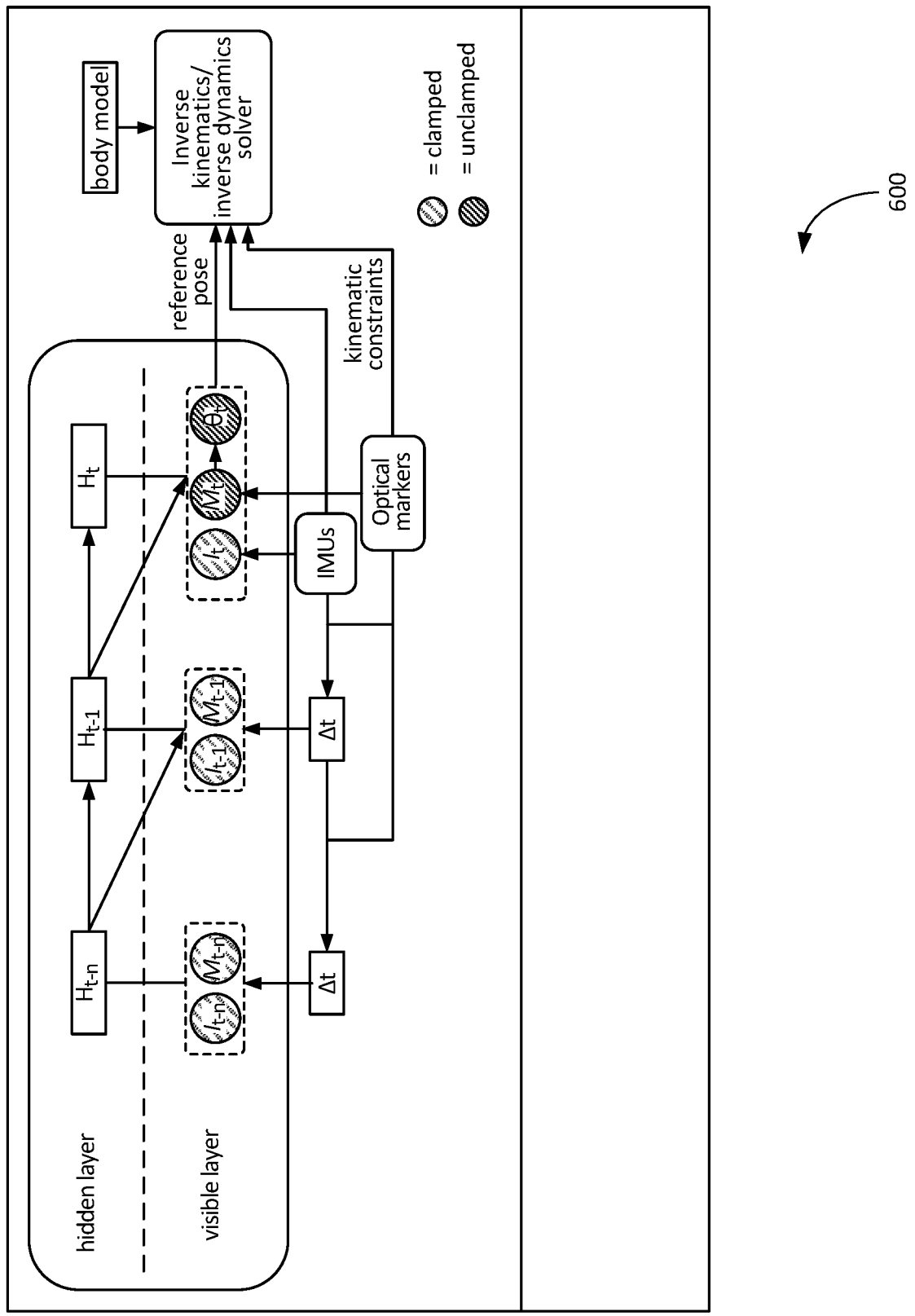
FIG. 6 shows an example of using an RTRBM to fuse and estimate pose information during online performance capture.

At 806, pose information can be fused and estimated during online performance capture. The visible layer nodes corresponding to the reference pose $\Theta$ can be unclamped at 806. FIG. 6 shows an example of using an RTRBM to fuse and estimate pose information during online performance capture. As shown, the RTRBM 600 is use during real-time motion performance capture. The visible layer nodes corresponding to skeletal posture are unclamped and generated by simulating the remainder of the network. The skeleton pose and sensor data together form a set of kinematic constraints which may be tracked using an IK or inverse dynamics solver.

Figure 7:
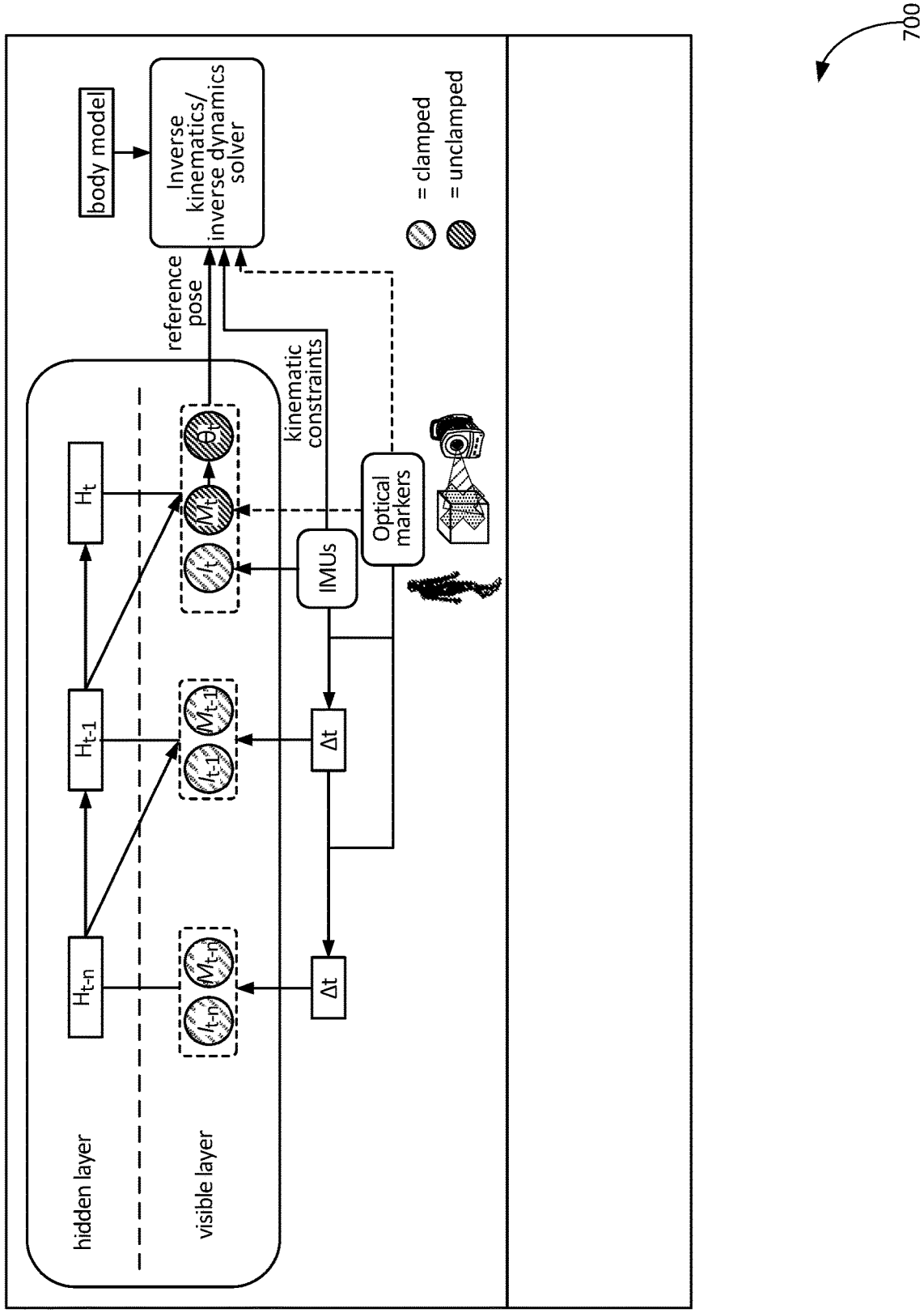
FIG. 7 illustrates an RTRBM is being used as a motion prior.

At 808, the pose estimated by the RTRBM at 806 can be used as a reference pose for an inverse kinematics or inverse dynamics tracker. Combining sensor data and pose estimates in this way can introduce a novel fusion and prediction solution. FIG. 7 illustrates an RTRBM 700 is being used as a motion prior. FIG. 7 shows an instance of an RTRBM 700 where optical marker data is unavailable due to occlusion. It should be understood the RTRBM 700 can also be applied to missing IMU data, partial dropout, or mixtures of dropout across sensor modalities. As shown, the visible layer nodes which correspond to the unavailable sensor data are unclamped. Simulating the network allows these nodes to take on a value which is probable given other sensor data, and previous motion estimates which are encoded by the recurrent hidden layers and buffered sensor data from previous frames. In addition to generating a reference pose for the skeleton, the network also generates the missing optical marker data.

I. Computer System

Figure 9:
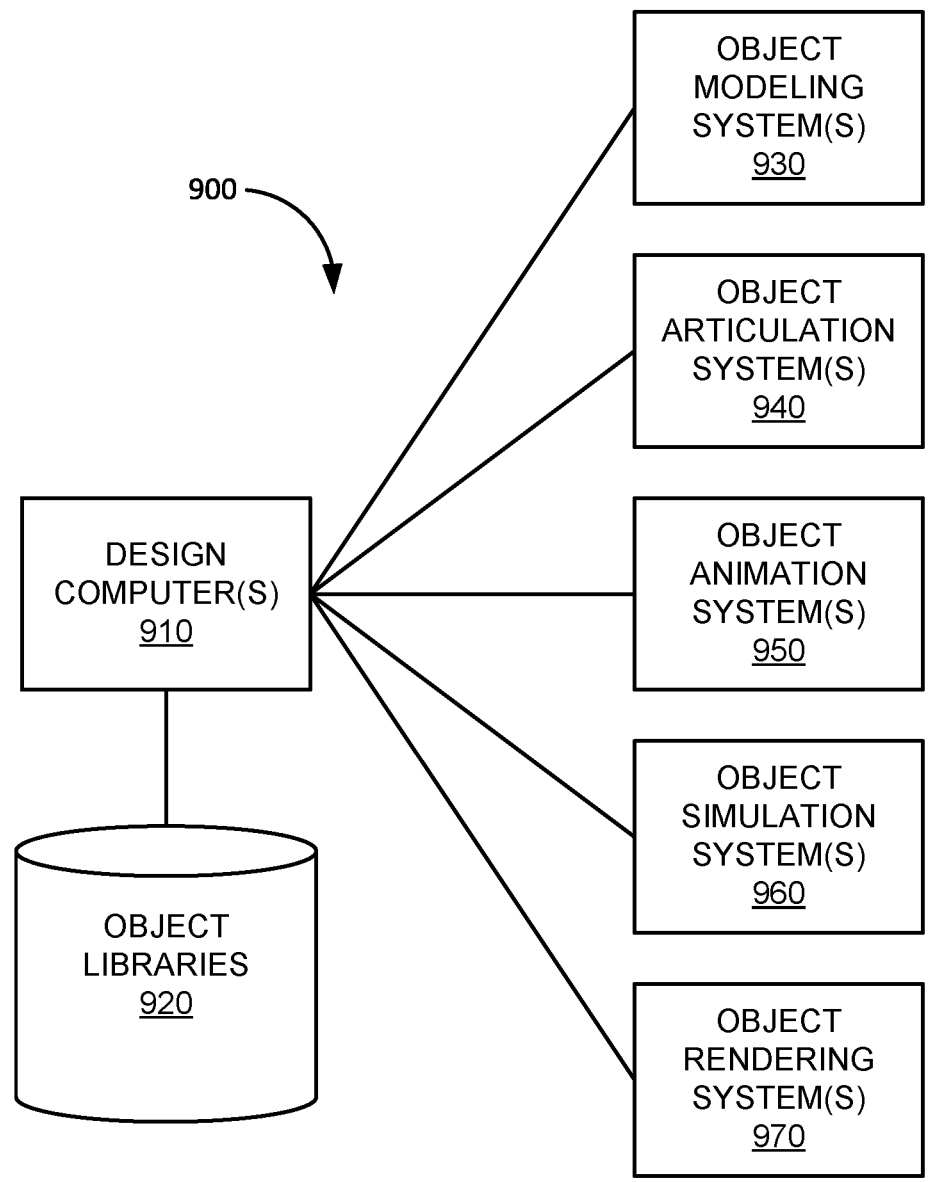
FIG. 9 is a simplified block diagram of system for creating computer graphics imagery (CGI) and computer-aided animation that may implement or incorporate various embodiments.

FIG. 9 is a simplified block diagram of system 900 for creating computer graphics imagery (CGI) and computer-aided animation that may implement or incorporate various embodiments. In this example, system 900 can include one or more design computers 910, object library 920, one or more object modeler systems 930, one or more object articulation systems 940, one or more object animation systems 950, one or more object simulation systems 960, and one or more object rendering systems 980. Any of the systems 930-980 may be invoked by or used directly by a user of the one or more design computers 910 and/or automatically invoked by or used by one or more processes associated with the one or more design computers 910. Any of the elements of system 900 can include hardware and/or software elements configured for specific functions.

The one or more design computers 910 can include hardware and software elements configured for designing CGI and assisting with computer-aided animation. Each of the one or more design computers 910 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 910 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 910 acting as a modeler may employ one or more systems or tools to design, create, or modify objects within a computer-generated scene. The modeler may use modeling software to sculpt and refine a 3D model to fit predefined aesthetic needs of one or more character designers. The modeler may design and maintain a modeling topology conducive to a storyboarded range of deformations. In another example, a user of the one or more design computers 910 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 910 acting as an animator may employ one or more systems or tools to specify motion and position of one or more objects over time to produce an animation.

Object library 920 can include elements configured for storing and accessing information related to objects used by the one or more design computers 910 during the various stages of a production process to produce CGI and animation. Some examples of object library 920 can include a file, a database, or other storage devices and mechanisms. Object library 920 may be locally accessible to the one or more design computers 910 or hosted by one or more external computer systems.

Some examples of information stored in object library 920 can include an object itself, metadata, object geometry, object topology, rigging, control data, animation data, animation cues, simulation data, texture data, lighting data, shader code, or the like. An object stored in object library 920 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 930 can include hardware and/or software elements configured for modeling one or more objects. Modeling can include the creating, sculpting, and editing of an object. In various embodiments, the one or more object modeling systems 930 may be configured to generated a model to include a description of the shape of an object. The one or more object modeling systems 930 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 930 may further generate model data (e.g., 2D and 3D model data) for use by other elements of system 900 or that can be stored in object library 920. The one or more object modeling systems 930 may be configured to allow a user to associate additional information, metadata, color, lighting, rigging, controls, or the like, with all or a portion of the generated model data.

The one or more object articulation systems 940 can include hardware and/or software elements configured to articulating one or more computer-generated objects. Articulation can include the building or creation of rigs, the rigging of an object, and the editing of rigging. In various embodiments, the one or more articulation systems 940 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 940 may further generate articulation data (e.g., data associated with controls or animations variables) for use by other elements of system 900 or that can be stored in object library 920. The one or more object articulation systems 940 may be configured to allow a user to associate additional information, metadata, color, lighting, rigging, controls, or the like, with all or a portion of the generated articulation data.

The one or more object animation systems 950 can include hardware and/or software elements configured for animating one or more computer-generated objects. Animation can include the specification of motion and position of an object over time. The one or more object animation systems 950 may be invoked by or used directly by a user of the one or more design computers 910 and/or automatically invoked by or used by one or more processes associated with the one or more design computers 910.

In various embodiments, the one or more animation systems 950 may be configured to enable users to manipulate controls or animation variables or utilized character rigging to specify one or more key frames of animation sequence. The one or more animation systems 950 generate intermediary frames based on the one or more key frames. In some embodiments, the one or more animation systems 950 may be configured to enable users to specify animation cues, paths, or the like according to one or more predefined sequences. The one or more animation systems 950 generate frames of the animation based on the animation cues or paths. In further embodiments, the one or more animation systems 950 may be configured to enable users to define animations using one or more animation languages, morphs, deformations, or the like.

The one or more object animations systems 950 may further generate animation data (e.g., inputs associated with controls or animations variables) for use by other elements of system 900 or that can be stored in object library 920. The one or more object animations systems 950 may be configured to allow a user to associate additional information, metadata, color, lighting, rigging, controls, or the like, with all or a portion of the generated animation data.

The one or more object simulation systems 960 can include hardware and/or software elements configured for simulating one or more computer-generated objects. Simulation can include determining motion and position of an object over time in response to one or more simulated forces or conditions. The one or more object simulation systems 960 may be invoked by or used directly by a user of the one or more design computers 910 and/or automatically invoked by or used by one or more processes associated with the one or more design computers 910.

In various embodiments, the one or more object simulation systems 960 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 960 may be used to simulate the behavior of objects, such as hair, fur, and cloth, in response to a physics model and/or animation of one or more characters and objects within a computer-generated scene.

The one or more object simulation systems 960 may further generate simulation data (e.g., motion and position of an object over time) for use by other elements of system 100 or that can be stored in object library 920. The generated simulation data may be combined with or used in addition to animation data generated by the one or more object animation systems 950. The one or more object simulation systems 960 may be configured to allow a user to associate additional information, metadata, color, lighting, rigging, controls, or the like, with all or a portion of the generated simulation data.

The one or more object rendering systems 980 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 980 may be invoked by or used directly by a user of the one or more design computers 910 and/or automatically invoked by or used by one or more processes associated with the one or more design computers 910. One example of a software program embodied as the one or more object rendering systems 980 can include PhotoRealistic RenderMan, or PRMan, produced by Pixar Animations Studios of Emeryville, Calif.

In various embodiments, the one or more object rendering systems 980 can be configured to render one or more objects to produce one or more computer-generated images or a set of images over time that provide an animation. The one or more object rendering systems 980 may generate digital images or raster graphics images.

In various embodiments, a rendered image can be understood in terms of a number of visible features. Some examples of visible features that may be considered by the one or more object rendering systems 980 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlight rays on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 980 may further render images (e.g., motion and position of an object over time) for use by other elements of system 900 or that can be stored in object library 920. The one or more object rendering systems 980 may be configured to allow a user to associate additional information or metadata with all or a portion of the rendered image.

Figure 10:
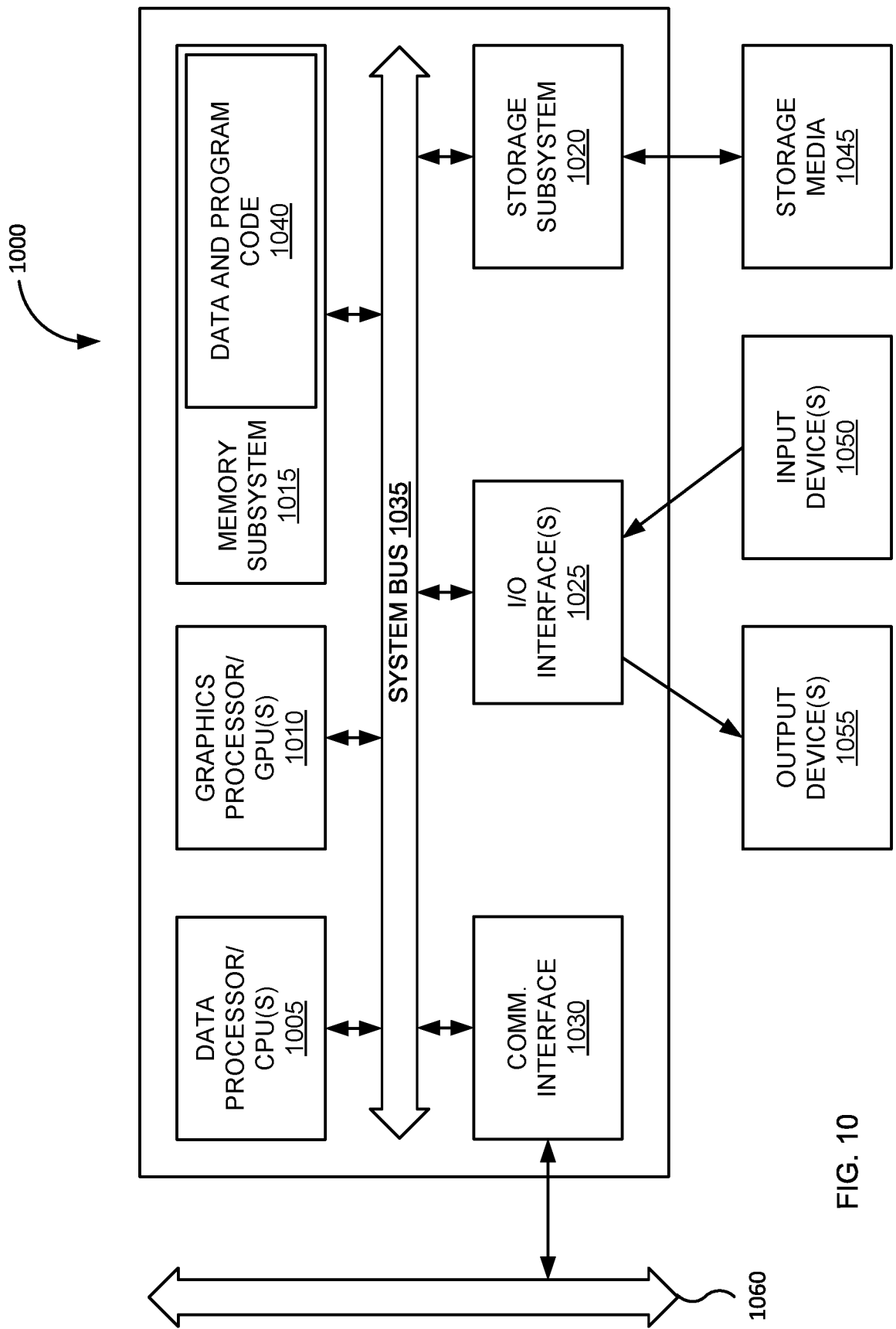
FIG. 10 is a block diagram of computer system that can be used to implement the deep learning motion estimation in accordance with the disclosure.

FIG. 10 is a block diagram of computer system 1000. FIG. 10 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 1000 and any of its components or subsystems can include hardware and/or software elements configured for performing methods described herein.

Computer system 1000 may include familiar computer components, such as one or more one or more data processors or central processing units (CPUs) 1005, one or more graphics processors or graphical processing units (GPUs) 1010, memory subsystem 1015, storage subsystem 1020, one or more input/output (I/O) interfaces 1025, communications interface 1030, or the like. Computer system 1000 can include system bus 1035 interconnecting the above components and providing functionality, such connectivity and inter-device communication.

The one or more data processors or central processing units (CPUs) 1005 can execute logic or program code or for providing application-specific functionality. Some examples of CPU(s) 1005 can include one or more microprocessors (e.g., single core and multi-core) or micro-controllers, one or more field-gate programmable arrays (FPGAs), and application-specific integrated circuits (ASICs). As used herein, a processor includes a multi-core processor on a same integrated chip, or multiple processing units on a single circuit board or networked.

The one or more graphics processor or graphical processing units (GPUs) 1010 can execute logic or program code associated with graphics or for providing graphics-specific functionality. GPUs 1010 may include any conventional graphics processing unit, such as those provided by conventional video cards. In various embodiments, GPUs 1010 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1010 may include any number of registers, logic units, arithmetic units, caches, memory interfaces, or the like.

Memory subsystem 1015 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 1015 can include data and program code 1040.

Storage subsystem 1020 can also store information using machine-readable articles, information storage devices, or computer-readable storage media. Storage subsystem 1020 may store information using storage media 1045. Some examples of storage media 1045 used by storage subsystem 1020 can include floppy disks, hard disks, optical storage media such as CD-ROMS, DVDs and bar codes, removable storage devices, networked storage devices, or the like. In some embodiments, all or part of data and program code 1040 may be stored using storage subsystem 1020.

The one or more input/output (I/O) interfaces 1025 can perform I/O operations. One or more input devices 1050 and/or one or more output devices 1055 may be communicatively coupled to the one or more I/O interfaces 1025. The one or more input devices 1050 can receive information from one or more sources for computer system 1000. Some examples of the one or more input devices 1050 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1050 may allow a user of computer system 1000 to interact with one or more non-graphical or graphical user interfaces to enter a comment, select objects, icons, text, user interface widgets, or other user interface elements that appear on a monitor/display device via a command, a click of a button, or the like.

The one or more output devices 1055 can output information to one or more destinations for computer system 1000. Some examples of the one or more output devices 1055 can include a printer, a fax, a feedback device for a mouse or joystick, external storage systems, a monitor or other display device, a communications interface appropriately configured as a transceiver, or the like. The one or more output devices 1055 may allow a user of computer system 1000 to view objects, icons, text, user interface widgets, or other user interface elements. A display device or monitor may be used with computer system 1000 and can include hardware and/or software elements configured for displaying information.

Communications interface 1030 can perform communications operations, including sending and receiving data. Some examples of communications interface 1030 may include a network communications interface (e.g. Ethernet, Wi-Fi, etc.). For example, communications interface 1030 may be coupled to communications network/external bus 1060, such as a computer network, a USB hub, or the like. A computer system can include a plurality of the same components or subsystems, e.g., connected together by communications interface 1030 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 1000 may also include one or more applications (e.g., software components or functions) to be executed by a processor to execute, perform, or otherwise implement techniques disclosed herein. These applications may be embodied as data and program code 1040. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1015 and/or storage subsystem 1020.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method for motion capture, the method being implemented by a processor configured to execute machine-readable instructions, the method comprising:
    obtaining a deep learning model, wherein the deep learning model includes a convolutional neural network (CNN);
    obtaining a set of training data and training the deep learning model using the training data to generate a motion model, the training data including temporal and spatial information regarding one or more actors' motion captured previously, wherein the training of the deep learning model includes:
    receiving the spatial information in a first stream to learn a spatial relationship of the one or more actors' motion captured previously using a first set of one or more filters;
    receiving the temporal information in a second stream to learn a temporal relationship of the deep learning model using a second set of one or more filters, wherein the second stream is received independent of the first stream;
    mapping the set of training data to a ground truth skeleton pose using a fully connected feedforward neural network;
    receiving, from one or more motion capture sensors, real-time motion data for the one or more actor's motion;
    identifying missing motion information in the received real-time motion data introduced by the one or more motion capture sensors; and
    estimating the missing motion information regarding the actor's motion based on the received real-time motion data using the deep learning model with inverse dynamics to estimate a reference pose for a frame and combining the received real-time motion data with the estimated reference pose to solve for orientation and position constraints.

2. The method of claim 1, wherein the training of the motion model further includes connecting the first and second streams using a recurrent neural net (RNN).

3. The method of claim 2, wherein the training of the motion model further includes training the motion model using a stochastic gradient decent with Rectified Linear Unit (RELU) activation.

4. The method of claim 1, wherein the deep learning model includes a recurrent temporal restricted Boltzmann machine (RTRBM), and wherein training of the motion model includes receiving raw sensor data and presenting the sensor data to a network in a last visible layer of the RTRBM.

5. The method of claim 4, wherein training of the motion model includes synthesizing the raw sensor data and clamping all visible nodes with at least one of the raw sensor data and the synthesized sensor data.

6. A system for motion capture, the system comprising one or more of a processor configured to execute machine-readable instructions such that when the machine-readable instructions are executed, the process is caused to perform:
    obtaining a deep learning model, wherein the deep learning model includes a convolutional neural network (CNN);
    obtaining a set of training data and training the deep learning model using the training data to generate a motion model, the training data including temporal and spatial information regarding one or more actors' motion captured previously, wherein the training of the deep learning model includes:
    receiving the spatial information in a first stream to learn a spatial relationship of the one or more actors' motion captured previously using a first set of one or more filters;
    receiving the temporal information in a second stream to learn a temporal relationship of the deep learning model using a second set of one or more filters, wherein the second stream is received independent of the first stream;

mapping the set of training data to a ground truth skeleton pose using a fully connected feedforward neural network;

receiving, from one or more motion capture sensors, real-time motion data for the one or more actor's motion;

identifying missing motion information in the received real-time motion data introduced by the one or more motion capture sensors; and estimating the missing motion information regarding the actor's motion based on the received real-time motion data using the deep learning model with inverse dynamics to estimate a reference pose for a frame and combining the received real-time motion data with the estimated reference pose to solve for orientation and position constraints.

7. The system of claim 6, wherein the training of the motion model further includes connecting the first and second streams using a recurrent neural net (RNN).

8. The system of claim 7, wherein the training of the motion model further includes training the motion model using a stochastic gradient decent with Rectified Linear Unit (RELU) activation.

9. The system of claim 6, wherein the deep learning model includes a recurrent temporal restricted Boltzmann machine (RTRBM), and wherein training of the motion model includes receiving raw sensor data and presenting the sensor data to a network in a last visible layer of the RTRBM.

10. The system of claim 9, wherein training of the motion model includes synthesizing the raw sensor data and clamping all visible nodes with the raw sensor data and/or the synthesized sensor data.

11. A computer-readable medium storing a plurality of instructions that, when executed by one or more processors of a computing device, cause the one or more processors to perform operations comprising:

obtaining a deep learning model, wherein the deep learning model includes a convolutional neural network (CNN);

obtaining a set of training data and training the deep learning model using the training data to generate a motion model, the training data including temporal and spatial information regarding one or more actors' motion captured previously, wherein the training of the deep learning model includes:

receiving the spatial information in a first stream to learn a spatial relationship of the one or more actors' motion captured previously using a first set of one or more filters;

receiving the temporal information in a second stream to learn a temporal relationship of the deep learning model using a second set of one or more filters, wherein the second stream is received independent of the first stream;

mapping the set of training data to a ground truth skeleton pose using a fully connected feedforward neural network;

receiving, from one or more motion capture sensors, real-time motion data for the one or more actor's motion;

identifying missing motion information in the received real-time motion data introduced by the one or more motion capture sensors; and estimating the missing motion information regarding the actor's motion based on the received real-time motion data using the deep learning model with inverse dynamics to estimate a reference pose for a frame and combining the received real-time motion data with the estimated reference pose to solve for orientation and position constraints.

\* \* \* \* \*